UNITED STATES PATENT OFFICE.

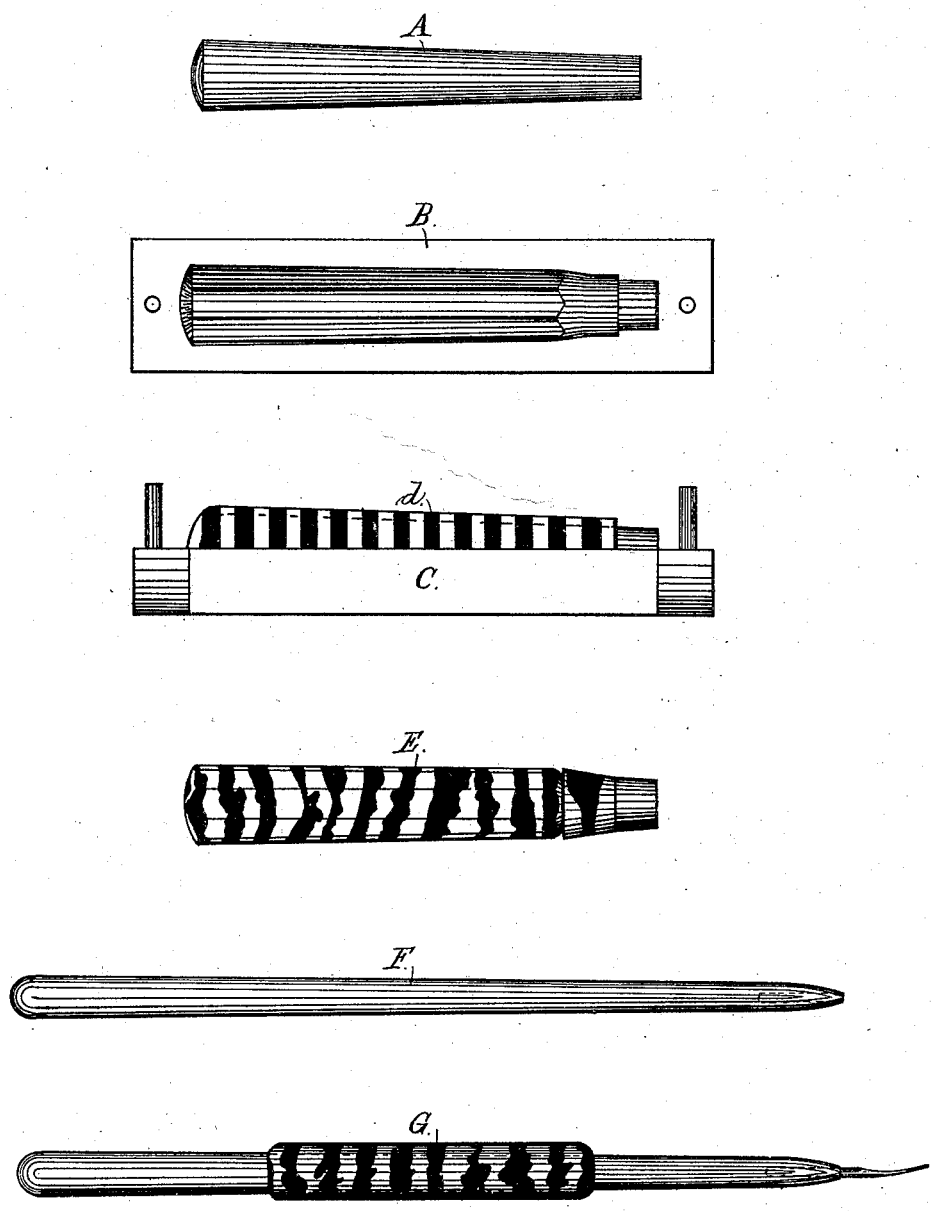

ROBERT B. DONALDSON, OF WASHINGTON, DISTRICT OF COLUMBIA.

IMPROVEMENT IN VULCANIZED-RUBBER HANDLES FOR DENTAL TOOLS, &c.

Specification forming part of Letters Patent No. 171,106, dated December 14, 1875; application filed December 1, 1875.

*To all whom it may concern:*

Be it known that I, ROBERT B. DONALDSON, of the city of Washington, District of Columbia, have invented a new and useful Improvement in Handles for Dental Tools, &c.; and I do hereby declare that the following, taken in connection with the drawings which accompany and form part of this specification, is a description of my invention sufficient to enable those skilled in the art to practice it.

My invention relates to a novel construction of handles, suitable for tools, implements, &c.; and it consists, as hereinafter more particularly described, of a metal or other center or core, having approximately the shape or contour and size desired for the finished handle, such core being first covered with pieces of sheet-rubber of any desired colors, and then placed in a suitable metal mold, the rubber being squeezed and compacted closely around the core as the parts of the mold are brought and secured together, prior to a vulcanization of the rubber while within this mold, and the core with its sheet-rubber wrapper thus vulcanized thereon, constituting the handle for the desired implement.

It is well known that hard vulcanized rubber has qualities rendering it very desirable in the arts; but it is too costly to be freely used except in small quantities. It is also, relatively to metal, of too light weight, and of not sufficient strength to be used as the material for the entire handle in many branches of art, as, for instance, for the handles of many dental implements, for which my invention is peculiarly appropriate, and with reference to which I will now describe and illustrate it.

In the drawings, A represents a metallic core, to form the main body of the handle, and which may be made of such size, weight, and form as may be found most desirable for the tool or implement to which it is to be applied. B C are the two parts of a metallic mold adapted to receive this core, but with sufficient space in their cavities to receive the core when wrapped or covered with the parti-colored rubber, as shown at *d;* and E illustrates one of my improved finished handles, suitable for a dental tool.

After placing upon the core its covering of sheet-rubber, whether the same be in one or many pieces, or of two or more colors, I place this covered core in one of the halves of the mold, the thickness of the rubber-covering being somewhat in excess of the space between the core and its mold. Then, upon putting to place the other half of the mold, the act of pressing or squeezing it down to place compacts and consolidates the rubber, reducing or destroying, to a great degree, its porosity, and making the finished handle more solid and durable, and also more susceptible of a high polish than the same would be if vulcanized out of a mold. The closing together of the molds also forces out any excess of rubber not actually required for the handle, thus requiring very little time and labor in finishing, after it is vulcanized. The parts of the mold being next firmly secured together, the whole is submitted to the action of superheated steam until the rubber is sufficiently vulcanized upon its metallic core or handle. It is then removed from the mold, and its surface properly finished.

This mode of construction allows of making the handles of a combination of colors, or pattern made up of parti-colors, whereby not only is their beauty enhanced, but various materials and stones, such as agate, &c., can be closely imitated, while their fragile character is avoided; but what is more important, a set of implements all having this rubber exterior and metal body, may each have a distinctive as well as beautiful appearance, each easily distinguishable from the others, so that the dentist or artist can instantly select from a large number of tools the particular one needed, without any hesitation or loss of time by reason of the usual similarity of handles.

The practical advantage of having the handles of dental instruments thus easily distinguishable one from the other, at a glance, is very great, and will be recognized and appreciated by all who are in the habit of using instruments for dental purposes.

The other practical advantages due to handles thus made are numerous, and may further, in part, be stated as follows: A very considerable weight, in many dental handles, is essential; my metal core permits them to be made of any weight required. Handles entirely of rubber would be too costly, too light, and lacking in strength for work of many sorts; nor could solid rubber handles be so uniformly vulcanized, nor be so close and compact in texture; besides, they would be too light for practical use.

By my construction the tang of the tool is inserted directly into the metal which forms the core or body of the handle, not into the rubber itself; hence the handle is able to resist any required strain.

The core may be of zinc or any proper metal, which, while readily molded to its form without requiring a very high temperature, may also, when desired, be easily drilled at its end to receive the tang of any tool; or the core may be cast around a wire of proper size, which, when withdrawn, will leave the opening for the reception of the tang of the instrument.

The "dental pluggers" used in connection with a "hand mallet," are now made wholly of steel, and a set of such instruments are distinguishable one from the other only by a close inspection of their respective points. This circumstance causes the dentist much inconvenience and loss of time during operations in which many different points are required. Upon instruments of this kind, or upon steel "socket-handles" for holding points, a covering of variously-tinted rubber, extending over that portion of the instrument which is held while being struck by the mallet, would be of great value, as after very little use, each point would at a glance be known by its own peculiar handle. These steel instruments, or the steel socket-handles, can be used, in my process, instead of the cast-metal core previously described, a suitable opening being left at each end of the mold, through which that portion of the instrument not intended to be covered by the rubber, could extend.

In the drawings, F represents an ordinary plugger, the stock of which is of solid metal; and G, a similar one, having a desired portion of the same covered with parti-colored rubber, as above set forth.

It is evident that handles made in accordance with my invention are suitable for umbrellas, parasols, canes, &c., and that they provide for meeting a want long felt; and that, by means of the unlimited range, as to using in one handle as many pieces, strips, or bits of different colors as taste or fancy may dictate, many novel and beautiful effects can be produced not hitherto attainable, and at a cost very much less than such articles could be manufactured for, if made of solid rubber.

I claim—

1. The described method of making rubber handles for dental and other implements, by covering a body or core with strips or pieces of rubber of different colors, placing such rubber-wrapped core in a mold, tightening and compressing the mold upon it, and then submitting the whole to the action of superheated steam to vulcanize and harden the rubber, all substantially as set forth.

2. As a new article of manufacture, a handle consisting of a core covered with strips or pieces of vulcanized rubber of different colors or patterns, substantially as and for the purpose described.

ROBERT B. DONALDSON.

Witnesses:
  H. C. THOMPSON,
  JOHN ROBEY, Jr.